US000001831H

United States Statutory Invention Registration [19]

[11] Reg. Number: H1,831

[45] Published: Feb. 1, 2000

Kelley et al.

[54] ERGONOMIC MOTOR GRADER VEHICLE CONTROL APPARATUS

[75] Inventors: Craig B. Kelley, Dunlap; Daniel E. Shearer; Susan M. Boast, both of Metamora, all of Ill.

[73] Assignee: Caterpillar Inc., Peoria, Ill.

[21] Appl. No.: 09/216,462

[22] Filed: Dec. 18, 1998

[51] Int. Cl.[7] ..... B62D 5/09

[52] U.S. Cl. ..... 180/333; 180/402

[56] References Cited

U.S. PATENT DOCUMENTS

| | | | |
|---|---|---|---|
| 4,478,308 | 10/1984 | Klaassen | 180/326 |
| 4,645,030 | 2/1987 | von Bernuth et al. | 180/333 |
| 4,730,691 | 3/1988 | Grigg | 180/329 |
| 5,002,454 | 3/1991 | Hadank et al. | 414/695.5 |
| 5,149,023 | 9/1992 | Sakurai et al. | 244/229 |
| 5,261,291 | 11/1993 | Schoch et al. | 74/484 R |
| 5,356,259 | 10/1994 | Hanamoto et al. | 414/694 |
| 5,412,299 | 5/1995 | Gregory et al. | 318/628 |
| 5,424,623 | 6/1995 | Allen et al. | 318/568.18 |
| 5,509,220 | 4/1996 | Cooper | 37/348 |
| 5,550,539 | 8/1996 | Miki et al. | 341/20 |
| 5,707,182 | 1/1998 | Leffer | 405/267 |

*Primary Examiner*—Harold J. Tudor
*Attorney, Agent, or Firm*—Kevin M. Kercher

[57] ABSTRACT

A motor grader vehicle control apparatus is provided including first and second joystick assemblies for controlling a blade and vehicle drive and steering systems. Additional control mechanisms are included on the joystick assemblies to provide further control of the blade and vehicle systems. Movement of the joystick assemblies correspond to operations of the blade and vehicles systems in an ergonomic and intuitive manner.

16 Claims, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ERGONOMIC MOTOR GRADER VEHICLE CONTROL APPARATUS

TECHNICAL FIELD

The present invention relates generally to an apparatus for controlling the various systems and operations of a motor grader. Specifically, the present invention relates to a multiple joystick arrangement for ergonomically and intuitively controlling the motor grader blade and vehicle steering and drive systems.

BACKGROUND ART

Motor graders are used primarily as a finishing tool to sculpt a surface of earth to a final arrangement. Typically, motor graders include up to eight or more hand-operated controls to steer the wheels of the grader, position the blade, and articulate the front frame of the grader among other operations. There are many drawbacks associated with these complex motor grader controls such as operator fatigue and stress. Moreover, the operator must have a relatively high degree of expertise to manipulate the many control levers effectively. As a result, inexperienced operators require long training periods to become sufficiently familiar with the controls and the motor grader operations with which they are associated.

DISCLOSURE OF THE INVENTION

The present invention provides a motor grader vehicle control apparatus including a vehicle steering system, vehicle drive system and a blade. First and second joystick assemblies are provided for controlling the blade and vehicle drive and steering systems wherein the first joystick assembly substantially operates the blade and the second joystick substantially operates the vehicle steering and drive systems. Additional control mechanisms and switches are provided for further control of the blade and vehicle systems operations. Movement of the joystick assemblies' controls correlate to the motor grader operations in an ergonomic and intuitive manner.

Best Mode for Carrying Out the Invention

Figure 1:
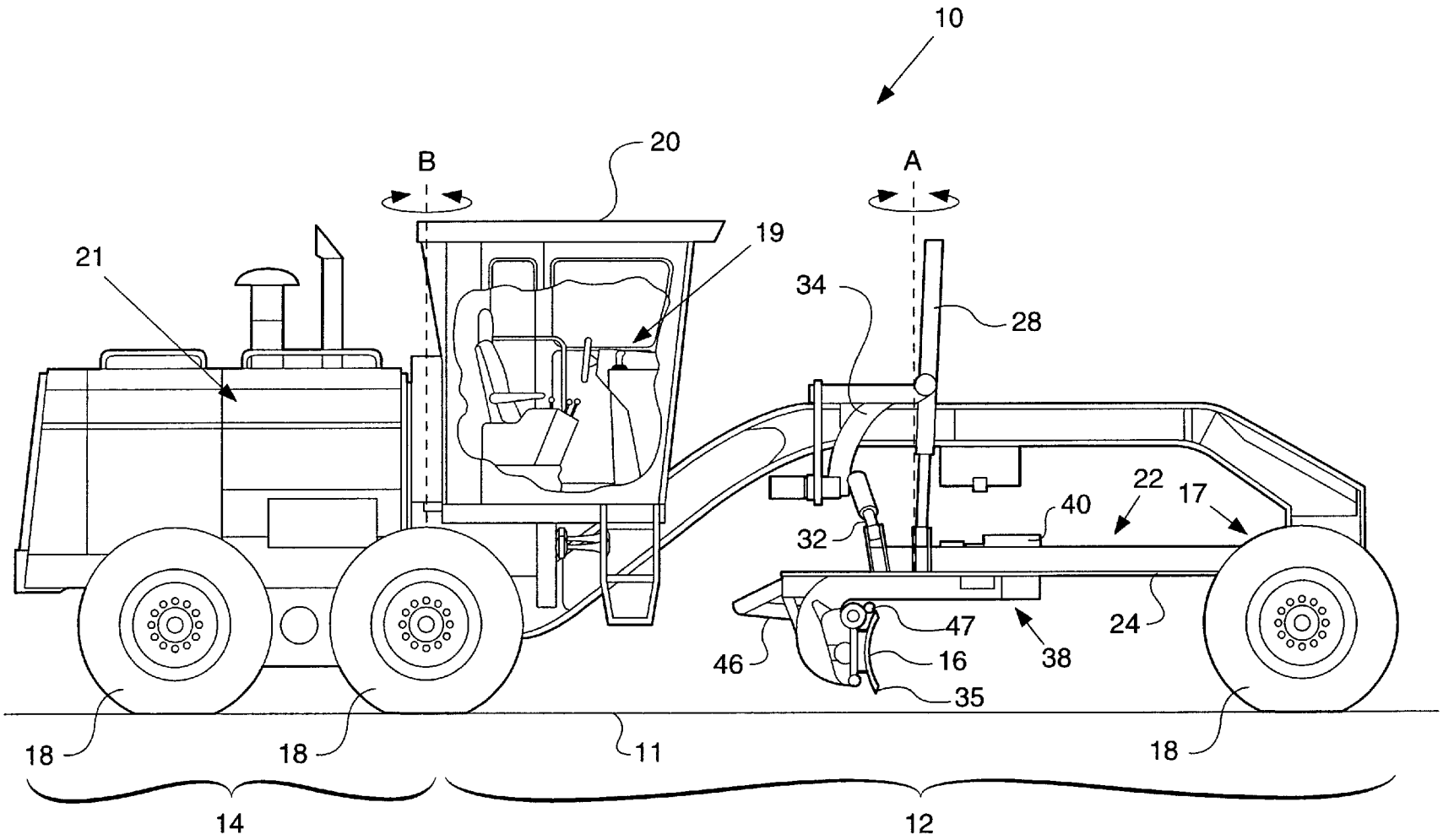
FIG. 1 is a side view of a motor grader.
Figure 2:
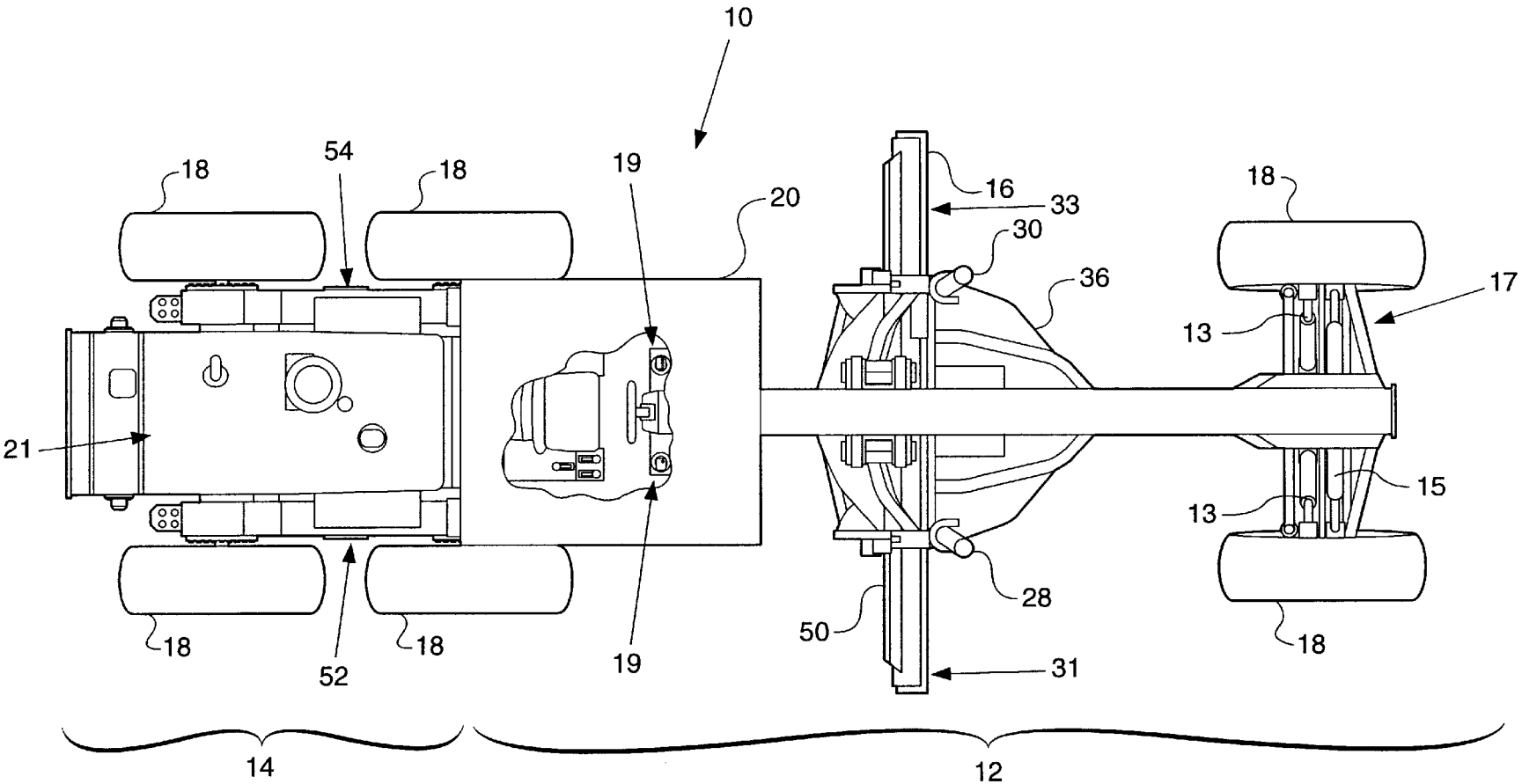
FIG. 2 is a top view of the motor grader of FIG. 1.
Figure 3:
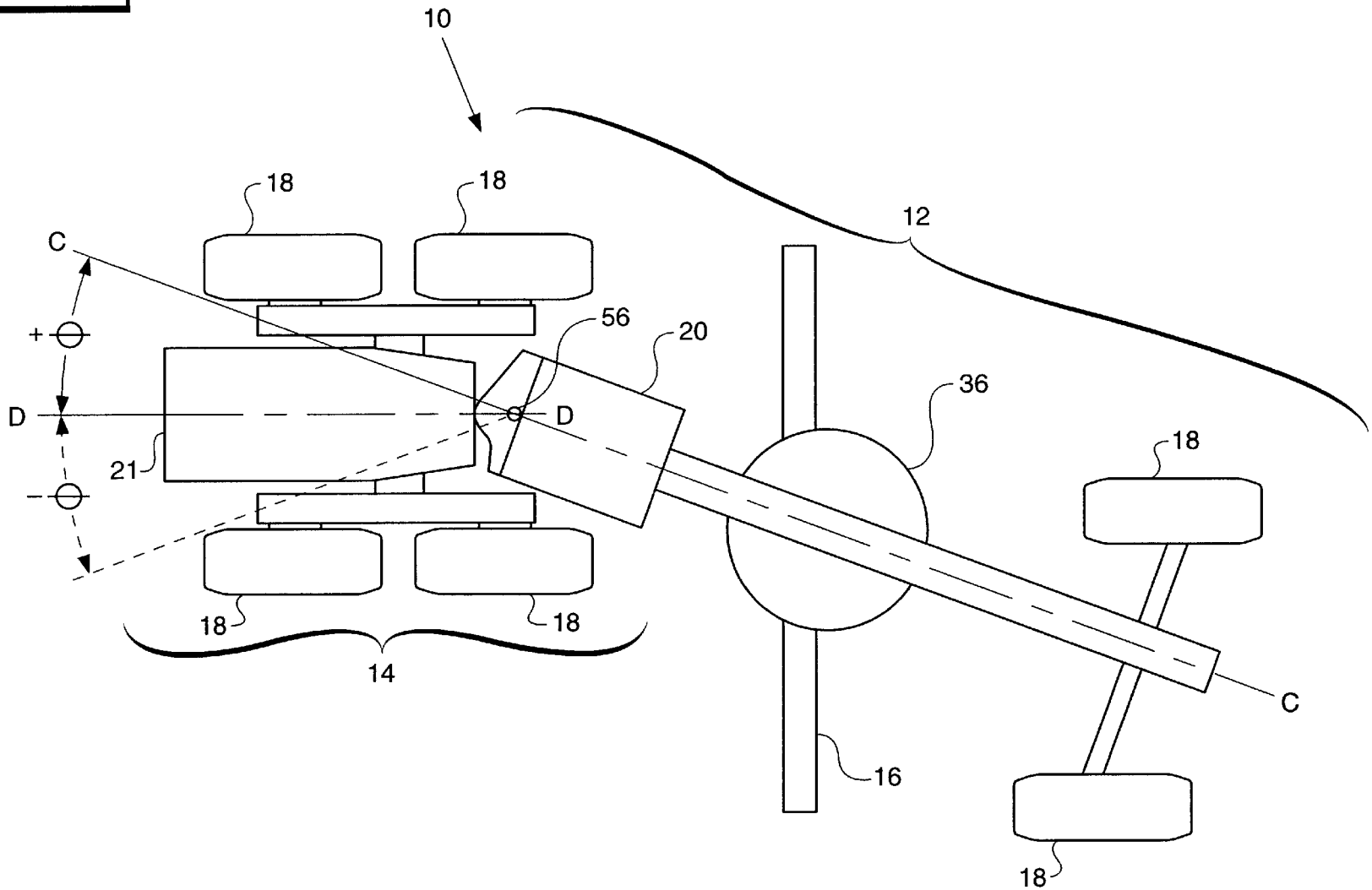
FIG. 3 is a top schematic view of the motor grader of FIG. 2 rotated to a full right articulation angle.

Referring to FIGS. 1–3, a motor grader is shown generally at 10. The motor grader 10 is used primarily as a finishing tool to sculpt a surface of earth 11 to a final arrangement. Rather than moving large quantities of earth in the direction of travel like other machines, such as a bulldozer, the motor grader 10 typically moves relatively small quantities of earth from side to side. In other words, the motor grader 10 typically moves earth across the area being graded, not straight ahead.

The motor grader 10 includes a front frame 12, a rear frame 14, and a blade 16. The front and rear frames 12 and 14 are supported by wheels 18. An operator cab 20, containing many controls 19 necessary to operate the motor grader 10, is mounted on the front frame 12. The controls 19 in FIGS. 2 and 3 are indicative of the complex multiple lever-controlled system of the prior art. An engine, transmission, and differential axle, collectively comprise a vehicle drive system shown generally at 21 mounted on the rear frame 14. The vehicle drive system 21 is used to drive or power the motor grader 10. The transmission includes a plurality of forward and reverse gears and a neutral gear in which none of the forward and reverse gears are engaged. Motor grader transmissions often have up to eight forward gears and eight reverse gears. The transmission is connected to a differential axle having a wheel 18 on each side that may be locked so that both wheels 18 may be driven during slippery conditions.

A vehicle steering system 17 includes steering cylinders 13 that turn the wheels 18 on the front frame 14. The vehicle steering system 17 also includes a wheel lean cylinder 15 that tilts the wheels 18 on the front frame 14 from left to right.

The blade 16, sometimes referred to as a moldboard, is used to move earth. The blade 16 is mounted on a linkage assembly, shown generally at 22. The linkage assembly 22 allows the blade 16 to be moved to a variety of different positions relative to the motor grader 10.

The linkage assembly 22 includes a drawbar 24 mounted to the front frame 12 by a ball joint. The position of the drawbar 24 is controlled by three hydraulic cylinders, commonly referred to as a right lift cylinder 28, a left lift cylinder 30, and a centershift cylinder 32. A coupling, shown generally at 34, connects the three cylinders 28, 30, and 32 to the front frame 12. The coupling 34 can be moved during blade repositioning but is fixed stationary during earthmoving operations. The height of the blade 16 with respect to the surface of earth 11 below the motor grader 10, commonly referred to as blade height, is controlled primarily with the right and left lift cylinders 28 and 30. The right and left lift cylinders 28 and 30 are connected to right 31 and left 33 portions of the blade 16 respectively. The cylinders 28, 30 can be controlled independently and, thus, used to angle a bottom cutting edge 35 of the blade 16 relative to the surface of earth 11. The centershift cylinder 32 is used primarily to sideshift the drawbar 24, and all the components mounted to the end of the drawbar including the blade 16, relative to the front frame 12. This sideshift is commonly referred to as drawbar sideshift or circle centershift.

The drawbar 24 includes a large, flat plate, commonly referred to as a yoke plate 36, as shown in FIGS. 2 and 3. Beneath the yoke plate 36 is a large gear, commonly referred to as a circle 38. The circle 38 is rotated by a hydraulic motor, commonly referred to as a circle drive 40, as shown in FIG. 2. The rotation of the circle 38 by the circle drive 40, commonly referred to as circle turn, pivots the blade 16 about an axis A fixed to the drawbar 24 to establish a blade cutting angle. The blade cutting angle is defined as the angle of the blade 16 relative to the front frame 12. At a zero degree blade cutting angle, the blade 16 is aligned at a right angle to the front frame 12. In FIG. 2, the blade 16 is set at a zero degree blade cutting angle.

The blade 16 is mounted to a hinge on the circle 38 with a bracket. A blade tip cylinder 46 is used to pitch the bracket forward or rearward. In other words, the blade tip cylinder 46 is used to tip or tilt a top edge 47 of the blade 16 ahead of or behind the bottom cutting edge 35 of the blade 16. The position of the top edge 47 of the blade 16 relative to the bottom cutting edge 35 of the blade 16 is commonly referred to as blade tip.

The blade 16 is mounted to a sliding joint in the bracket allowing the blade 16 to be slid or shifted from side to side relative to the bracket or the circle 38. This side to side shift is commonly referred to as blade sideshift. A sideshift cylinder 50 is used to control the blade sideshift.

Referring now to FIG. 2, a right articulation cylinder, shown generally at 52, is mounted to the right side of the rear frame 14 and a left articulation cylinder, shown generally at 54, is mounted to the left side of the rear frame 14. The right and left articulation cylinders 52 and 54 are used to rotate the front frame 12 about an axis B shown in FIG. 1. The axis B is commonly referred to as the articulation axis. In FIG. 2, the motor grader 10 is positioned in a neutral or zero articulation angle.

FIG. 3 is a top schematic view of the motor grader 10 with the front frame 12 rotated to a full right articulation angle θ. The articulation angle θ is formed by the intersection of the longitudinal axis C of the front frame 12 and the longitudinal axis D of the rear frame 14. An articulation joint 56 connects the front frame 12 and the rear frame 14. A rotary sensor, used to measure the articulation angle θ, is positioned at the articulation joint 56. A full left articulation angle θ, shown in phantom lines in FIG. 3, is a mirror image of the full right articulation angle θ. The motor grader 10 may be operated with the front frame 12 rotated to the full right articulation angle θ, the full left articulation angle θ, or any angle therebetween.

Figure 4:
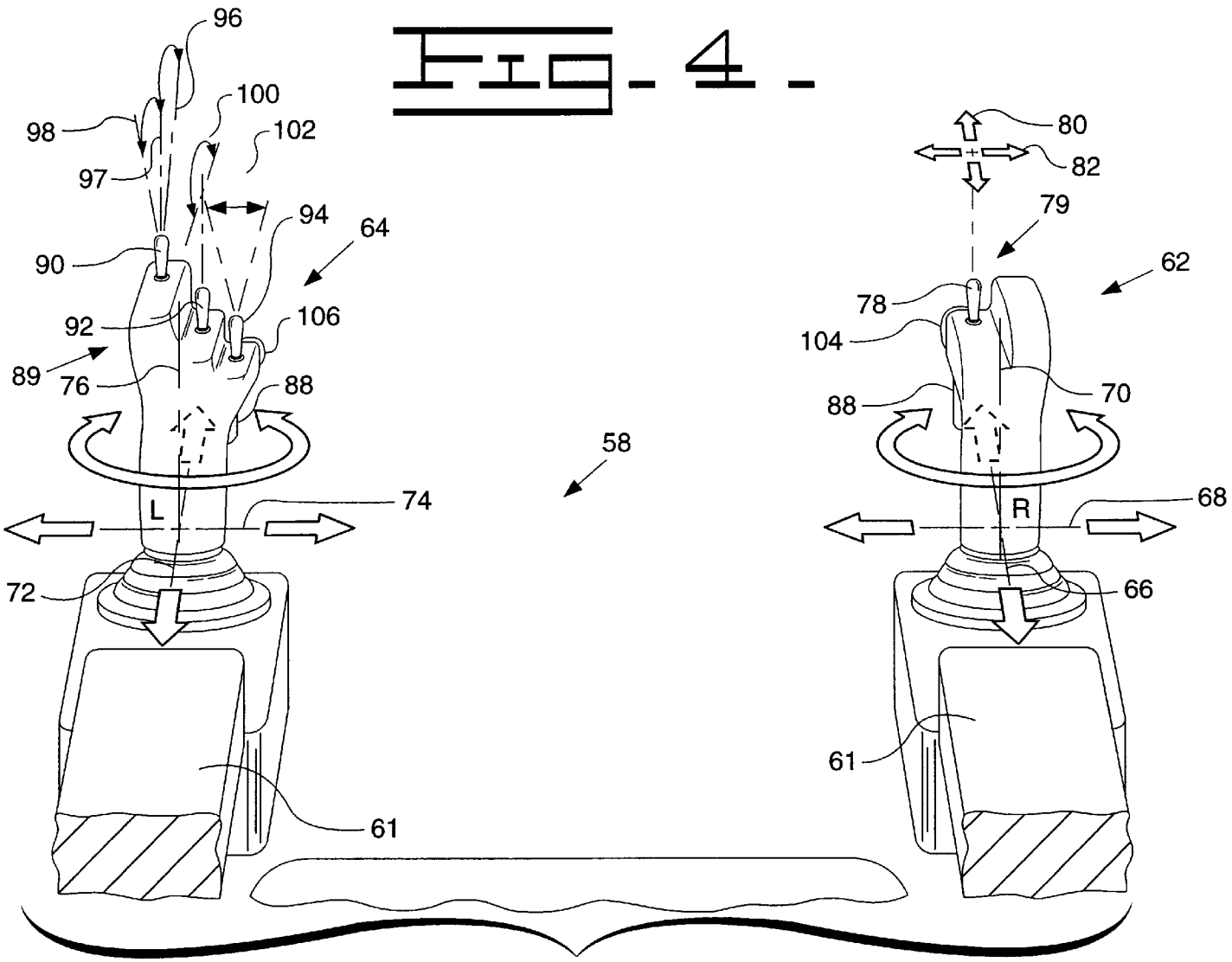
FIG. 4 is a perspective view a motor grader vehicle control apparatus of the present invention.

Referring to FIG. 4, a partial perspective view of an operator seat 58 for a cab 20 is shown. The seat 58 has armrests 61 with first 62 and second 64 joystick assemblies attached thereto. The joystick assemblies 62, 64 provide the controls for the blade 16 and the vehicle drive 21 and steering 17 systems in an ergonomic and intuitive manner and replace the many hand-operated controls 19 of the prior art. That is to say that the joystick assemblies 62, 64 relate to the operations of the motor grader 10 in a manner that would be easily learned and manipulated by an operator.

The first 62 and second 64 joystick assemblies have multiple axes of movement that correspond with a similar movement for one of the blade 16, vehicle drive 21 and steering 17 systems operations. To make joystick operation more intuitive, the first joystick assembly 62 is associated substantially with blade 16 operations while the second joystick assembly 64 is associated substantially with the vehicle drive 21 and steering 17 systems operations. However, there may be some overlap between the operations the joystick assemblies 62, 64 control, that is, the first joystick assembly 62 may control some vehicle steering 17 and drive 21 systems operations and the second joystick assembly 64 may control some blade 16 operations. Furthermore, the functions of the first joystick assembly 62 may be switched with the functions of the second joystick assembly 64.

The first joystick assembly 62 includes first 66 and second 68 intersecting axes and a third axis 70 perpendicular to the first 66 and second 68 axes.

Similarly, the second joystick assembly 64 includes fourth 72 and fifth 74 intersecting axes and a sixth axis 76 perpendicular to the fourth 72 and fifth 74 axes.

Figure 5:
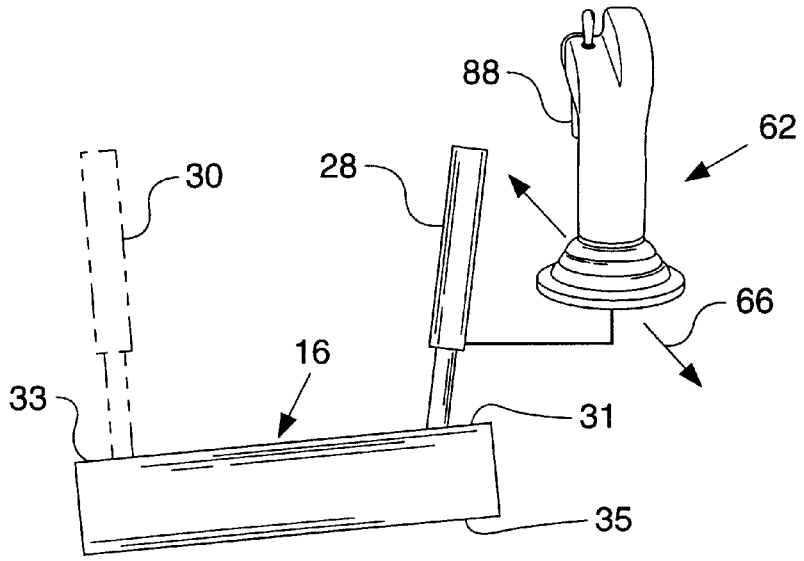
FIG. 5 is a schematic view of right blade portion operation of the present invention.

The first joystick assembly 62 is movable along the first axis 66 in forward and rearward directions for lowering and raising respectively the right portion 31 of the blade 16 relative to the surface 11 as shown in FIG. 5. Thus, when the first joystick assembly 62 is moved along the first axis 66, the right cylinder 28 is actuated thereby adjusting the blade height of the right portion 31 of the blade 16.

Figure 6:
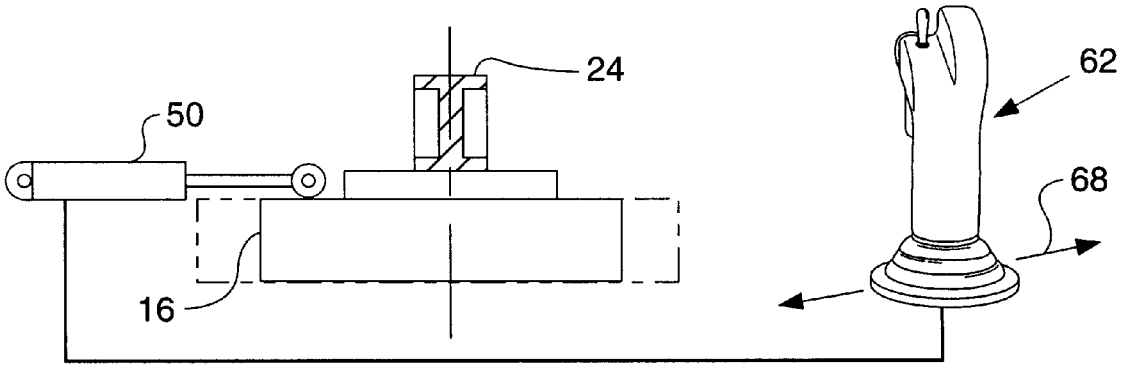
FIG. 6 is a schematic view of sideshift blade operation of the present invention.

As shown in FIG. 6, first joystick assembly 62 is movable along the second axis 68 in left and right directions for moving the blade 16 left and right respectively thereby controlling blade sideshift. Hence, when the first joystick assembly 62 is moved along the second axis 68, the sideshift cylinder 50 is actuated thereby shifting the blade from side to side.

Figure 7:
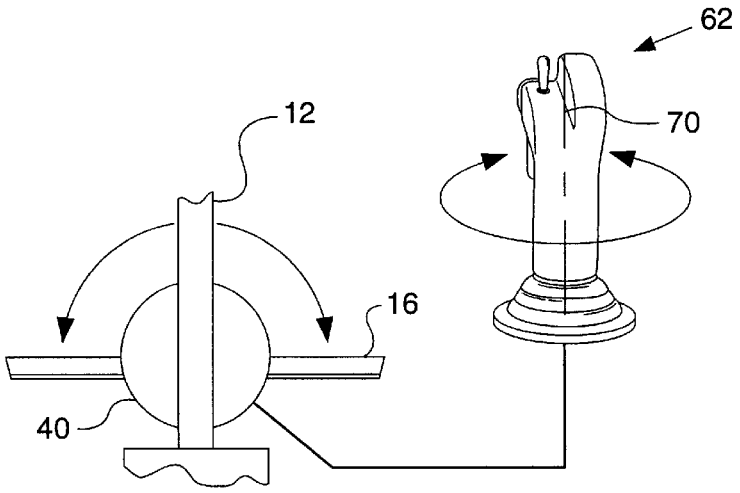
FIG. 7 is a schematic view of circle drive operation of the present invention.

Referring to FIG. 7, first joystick assembly 62 is rotatable about the third axis 70 for rotating the blade 16. Thus, as the first joystick assembly 62 is rotated, the circle drive 40 is actuated thereby adjusting the blade angle in the same direction of rotation as the joystick assembly 62.

Figure 8:
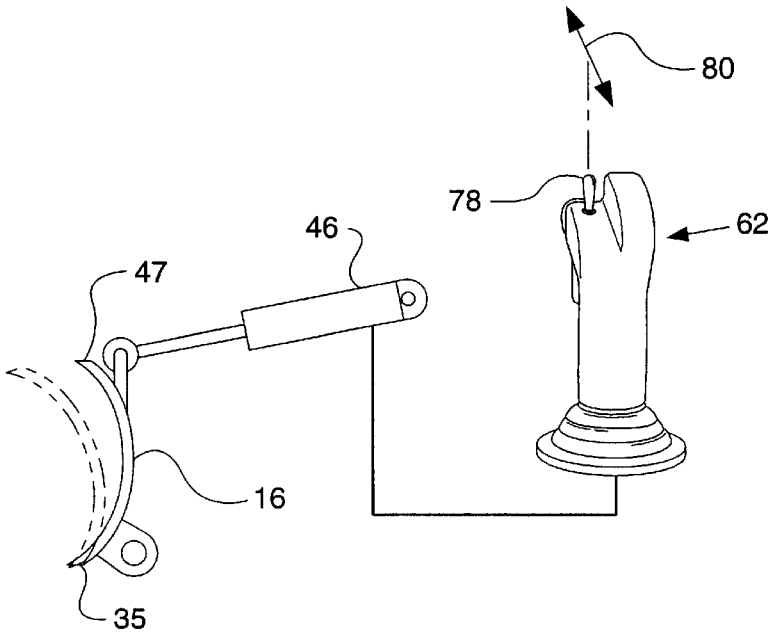
FIG. 8 is a schematic view of blade tilt operation of the present invention.
Figure 9:
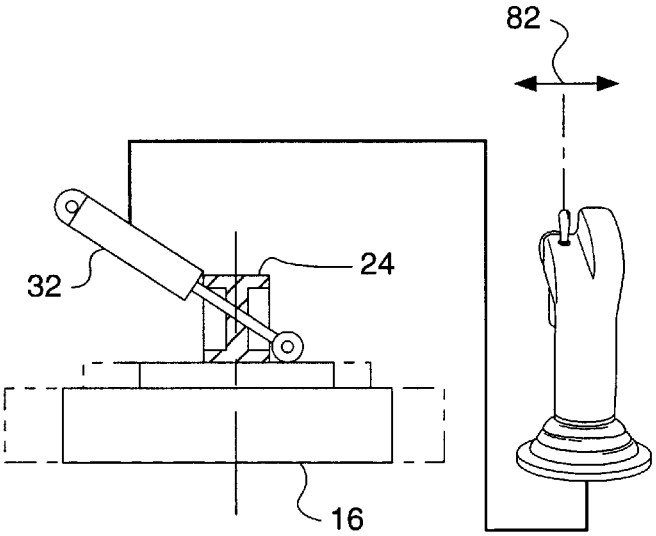
FIG. 9 is a schematic view of centershift blade operation of the present invention.

A secondary control mechanism 78 is located on an upper portion 79 of the first joystick assembly 62 for controlling additional blade operations. Secondary control mechanism 78 includes seventh 80 and eighth 82 intersecting axes. Referring to FIG. 8, secondary control mechanism 78 is movable in forward and rearward direction along the seventh axis 80 for tilting the blade forward and rearward respectively by actuating blade tip cylinder 46. Secondary control mechanism 78 is also movable in left and right directions along the eighth axis 82 for moving the drawbar 24 laterally left and right respectively, as shown in FIG. 9. This centershifting operation is accomplished by actuation of the centershift cylinder 32 in response to the left and right movements of the secondary control mechanism 78.

Figure 10:
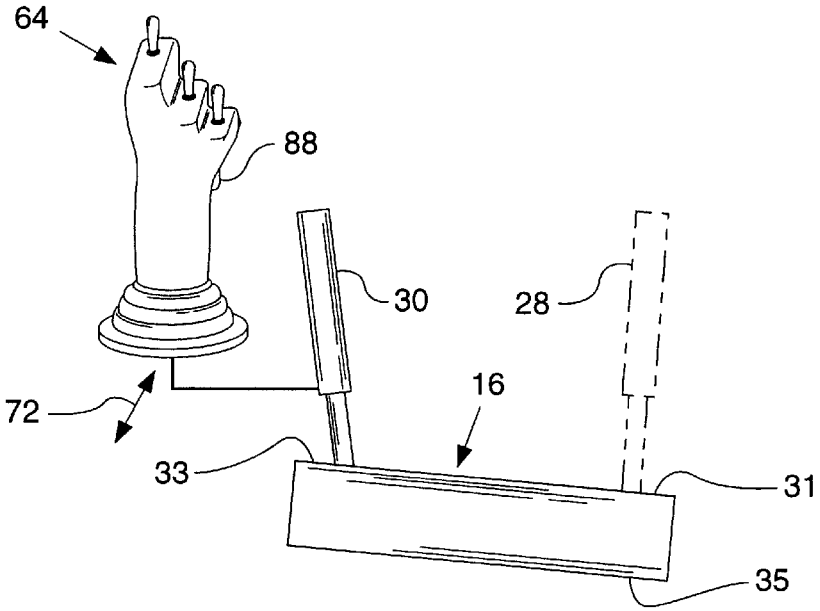
FIG. 10 is a schematic view of left blade portion operation of the present invention.

Referring to FIG. 10, second joystick assembly 64 is movable in forward and rearward directions along the fourth axis 72 for lowering and raising the left portion 33 of the blade 16 respectively. Hence, when second joystick assembly 64 is moved along the fourth axis 72, the left cylinder 30 is actuated thereby adjusting blade height of the right portion 33 of blade 16.

Each of the first 62 and second 64 joystick assemblies include a trigger 88 which raises or lowers the left 33 and right 31 portions of the blade 16 simultaneously when either of the first 62 and second 64 joystick assemblies are moved forward and rearward. This feature enables the operator to maintain the angle of the bottom cutting edge 35 of the blade 16 relative to the surface 11 when raising and lowering the blade 16. Thus, the right 28 and left 30 cylinder are actuated simultaneously and move at the same rate.

Figure 11:
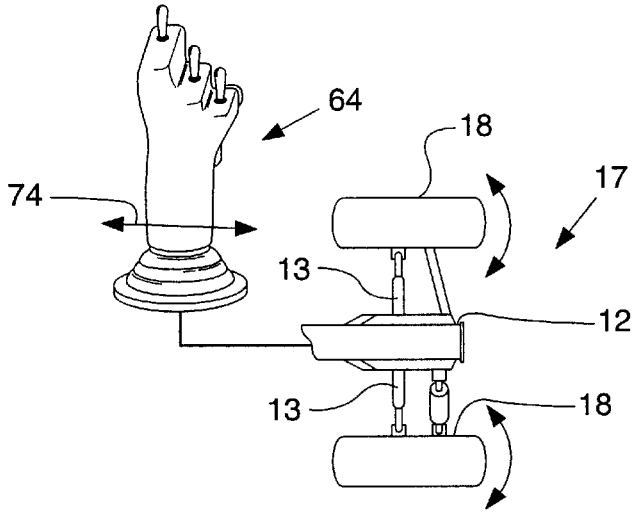
FIG. 11 is a schematic view of wheel steering operation of the present invention.

Referring now to FIG. 11, second joystick assembly 64 is movable in left and right directions along the fifth axis 74 for steering the wheels 18 on the front frame 14. As the second joystick assembly 64 is moved to the right, the wheels 18 angle toward the right. Similarly, as the second joystick assembly 64 is moved left the wheels 18 angle toward the left.

Figure 12:
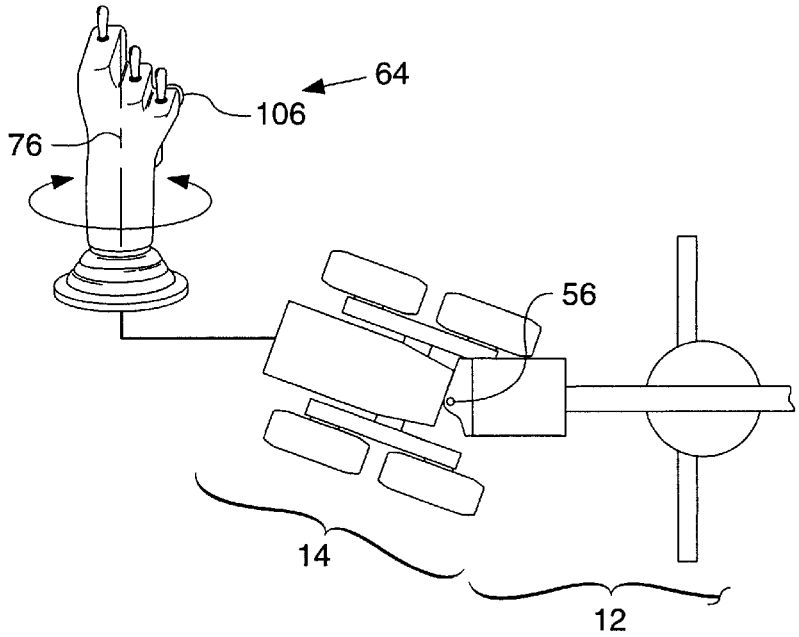
FIG. 12 is a schematic view of articulation operation of the present invention.

Right 52 and left 54 articulation cylinders are controlled by second joystick assembly 64 when the joystick assembly 64 is rotated about the sixth axis 76, as shown in FIG. 12. Thus, when the second joystick assembly 64 is rotated clockwise the front frame 12 moves to the right in a +_ direction. The front frame 12 move in a –_ direction or to the left when the second joystick assembly 64 is rotated counterclockwise.

Figure 13:
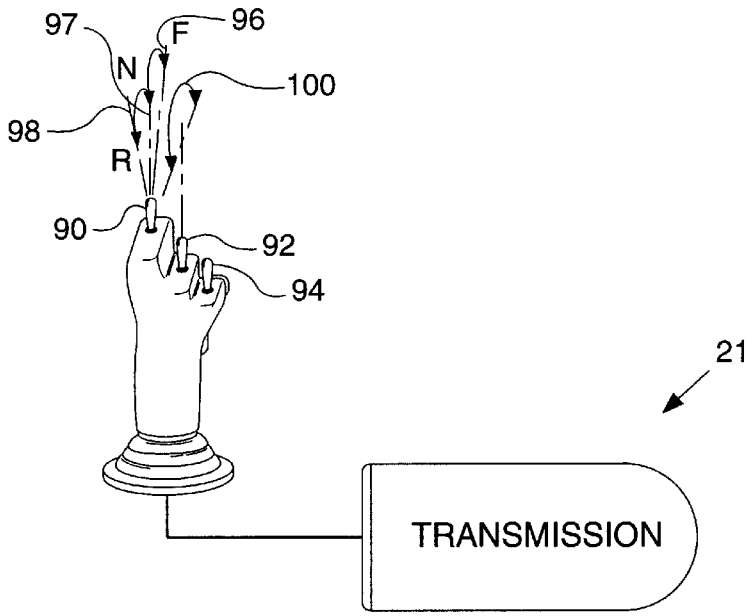
FIG. 13 is a schematic view of transmission operation of the present invention.

Referring to FIG. 13, a plurality of switches 90, 92, 94 are located on an upper portion 89 of the second joystick assembly 64 for providing further intuitive control of the motor grader's operations. A first switch 90 includes forward 96, neutral 97, and reverse 98 positions which correspond to the forward, neutral, and reverse gears of the transmission respectively. Thus, when the switch 90 is in the forward position 96 the forward gears are enabled. Reverse gears are enabled when the switch 90 is in the reverse position 98. While the neutral gear is enabled when switch 90 is in neutral position 97. The first switch 90 may be a single axis switch or any switch having three different positions.

A second switch 92, or bumpshift switch, is movable along a ninth axis 100 in forward and rearward directions for upshifting between the gears when the second switch 92 is moved forward and downshifting between the gears when the switch 92 is moved rearward. For example, if the first switch 90 is in the forward position 96 the forward gears are enabled. To make a shift from third to fourth gear the second switch 92 would be moved forward thereby completing the upshift. After shifting up or down, the second switch 92 centers itself for the next shift.

Figure 14:
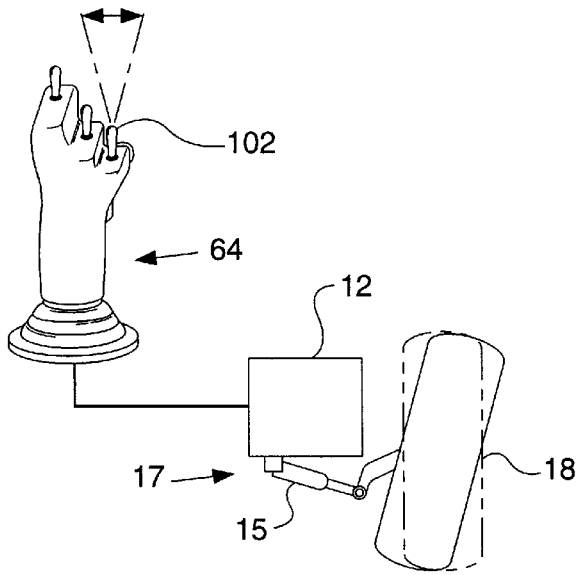
FIG. 14 is a schematic view of wheel lean operation of the present invention.

A third switch 94 is movable along a tenth axis 102 in right and left directions for actuating the wheel lean cylinder 15 and leaning the wheels 18 on the front frame 12, as shown in FIG. 14. Movement of the third switch 94 in the right direction causes wheels 18 to lean right while the left direction causes wheels 18 to lean left.

Figure 15:
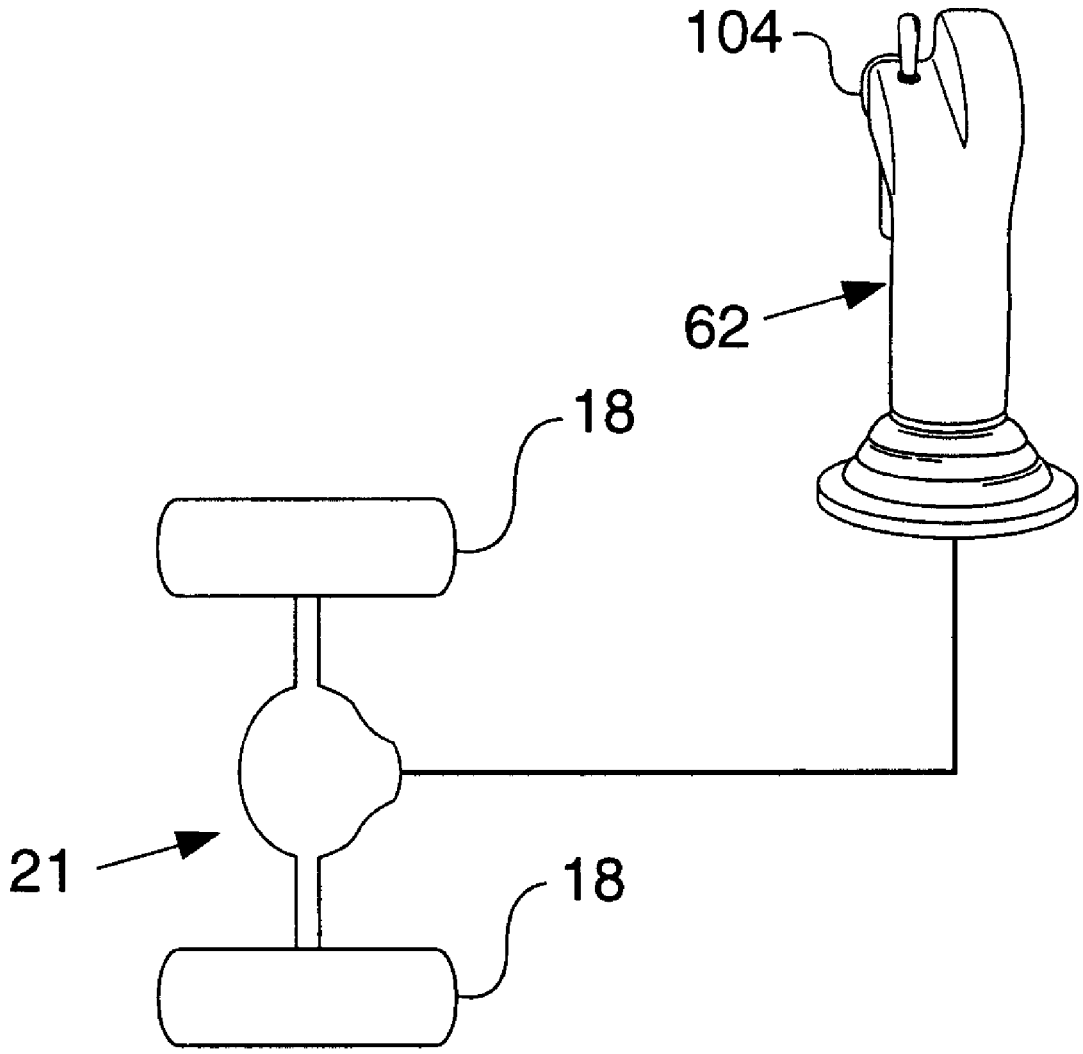
FIG. 15 is a schematic view of locking differential operation of the present invention.

Referring to FIG. 15, a first button 104 is positioned near the trigger 88 on the first joystick assembly 62. Actuating the first button 104 locks the differential axle so that both wheels 18 on the axle are drive thereby increasing the traction between the wheels 18 and the surface 11.

A second button 106 is positioned near trigger 88 on the second joystick assembly 64 which zeroes the articulation angle so that the longitudinal axes C and D of front 12 and rear 14 frames respectively are in a common plane.

It is to be understood that the above control elements and the vehicle operations associated with the control element may be modified within the scope of the invention. Accordingly, the invention has been described in an illustrative manner, and it is to be understood that the terminology which has been used is intended to be in the nature of words of description rather than of limitation.

Industrial Applicability

The invention relates to an apparatus that provides ergonomic and intuitive control of blade and vehicle drive steering systems of a motor grader. The apparatus includes first and second joystick assemblies movable about multiple axes.

The movement of the joystick assemblies and control mechanism correspond in a intuitive manner to the movements and operations of the blade and vehicle drive and steering systems which enable an operator to more effectively control the motor grader.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

We claim:

1. A motor grader vehicle control apparatus comprising:

a vehicle steering system for maneuvering the vehicle having front and rear frames pivotally connected and wheels supported thereon;

a vehicle drive system for propelling the vehicle having a transmission with a plurality of forward and reverse gears and a neutral gear, said transmission being connected to a differential axle;

a blade supported by said front frame for sculpting a surface of earth having left and right portions and an angle relative to the surface; and first and second joystick assemblies for controlling said blade, and said vehicle drive and steering systems.

2. The apparatus as set forth in claim 1 wherein said first joystick assembly is movable along first and second intersecting axes and rotatable about a third axis perpendicular to said first and second intersecting axes for substantially operating said blade, and said second joystick assembly is movable along fourth and fifth intersecting axes and rotatable about a sixth axis perpendicular to said fourth and fifth intersecting axes for substantially operating said blade said vehicle drive and steering systems.

3. The apparatus as set forth in claim 2 herein said first joystick assembly is rotatable about said third axis for rotating said blade relative to said front frame.

4. The apparatus as set forth in claim 2 further including a drawbar interposed between said front frame and said blade, said drawbar being movable relative to said front frame and said blade being movable relative to said drawbar, wherein said first joystick assembly is movable along said second axis in left and right directions for moving said blade laterally relative to said drawbar.

5. The apparatus as set forth in claim 2 further including a secondary control mechanism on said first joystick assembly movable along seventh and eighth axes, wherein said control mechanism is movable along said seventh axis in forward and rearward directions for tilting said blade forward and rearward relative the surface.

6. The apparatus as set forth in claim 5 wherein said secondary control mechanism is movable along said eighth axis in left and right directions for moving said drawbar laterally relative to said front frame.

7. The apparatus as set forth in claim 2 wherein said first joystick assembly is movable along said first axis in forward and rearward directions for raising and lowering said right portion of said blade relative to the surface.

8. The apparatus as set forth in claim 7 wherein said second joystick assembly is movable along said fourth axis in forward and rearward directions for raising and lowering said left portion of said blade relative to the surface.

9. The apparatus as set forth in claim 8 further including a trigger on each of said first and second joystick assemblies, wherein actuating one of said triggers while moving either of said first and second joystick assemblies rearward and forward raises and lowers said right and left portions of said blade simultaneously relative to the surface.

10. The apparatus as set forth in claim 2 further including a first switch on said second joystick assembly having forward, neutral, and reverse positions corresponding to said forward, neutral, and reverse gears respectively of said transmission, wherein said first switch enables one of said forward, neutral, and reverse gears when said first switch moves to one of said forward, neutral, and reverse positions respectively.

11. The apparatus as set forth in claim 2 further including a second switch on said second joystick assembly movable along a ninth axis in forward and rearward directions for upshifting between said plurality of gears when said second switch is moved in a forward direction and downshifting between said plurality of gears when said second switch is moved in a rearward direction.

12. The apparatus as set forth in claim 2 wherein said second joystick assembly is movable along said fifth axis in left and right directions for steering two of said wheels.

13. The apparatus as set forth in claim 12 further including a third switch attached to said second joystick assembly movable along a tenth axis in left and right directions for leaning said two of said wheels to the left and right respectively.

14. The apparatus as set forth in claim 2 further including a first button on said first joystick assembly, wherein actuating said first button locks said differential axle.

15. The apparatus as set forth in claim 2 wherein said second joystick assembly is rotatable about said sixth axis for rotating said front frame relative to said rear frame.

16. The apparatus as set forth in claim 15 further including a second button on said second joystick assembly, wherein actuating said second button rotates said front frame relative to said rear frame until said front and rear frame are aligned in a common plane.

* * * * *